3,101,299
SILICA-GEL POWDER TABLET COMPOSITIONS
Marcel Ferrand, Lyon, France, assignor to Societe
 Parisienne d'Expansion Chimique S.P.E.C.I.A., Paris,
 France, a French body corporate
No Drawing. Filed Oct. 30, 1961, Ser. No. 148,743
Claims priority, application France Nov. 17, 1960
3 Claims. (Cl. 167—82)

This invention relates to the production of tablets of chemical compositions and more especially, tablets of pharmaceutical compositions.

The tablet is one of the forms in which pharmaceutical products, and more especially pharmaceutical products for administration by the oral route, are prepared. In the case of tablets for oral administration, however, there are a number of distinct types: some must be slowly dissolved in the mouth, others must be administered after having been disintegrated in a little water, and others must be swallowed so that they disintegrate only in the stomach or only in the intestine.

Each of these types of tablets must thus satisfy, in addition to general requirements of cohesion and regularity of dosage, requirements of a specific nature, and all of these requirements necessitate delicate processing by the manufacturer. Usually, such tablets are prepared from more or less complex mixtures which, in addition to the therapeutically active product, contain one or more adjuvants acting as diluents, absorbents, agglutinants, disintegrating agents and lubricants. These various constituents, after having been appropriately pulverised and then mixed, are sometimes directly compressed. However, some therapeutic compounds, and even some mixtures in which modifying adjuvants are employed, must previously be subjected to a granulating operation in order that they may be converted into appropriate agglomerates, which granulating operation may be carried out by a wet method or, when the use of water or organic diluents is undesirable, by a dry method.

These granulating operations obviously complicate the manufacture. It has now been discovered that pharmaceutical compositions which can be made up in the form of suitable tablets only by processes involving a preliminary granulation give, when the powder is directly compressed, quite satisfactory tablets if small quantities of silica gel in the form of microfine powder are incorporated in the mixtures. By microfine powder is meant powder of which the particle size is of the order of a millimicron.

These silica gels, by reason of their enormous surface area, have considerable absorbing power, by reason of which they have received wide industrial applications. They are used in pharmaceutical compositions to absorb moisture. The proportion of silica gel in the form of microfine powder which must be added for this purpose, however, is relatively high, for example from 5% to 10%. On the other hand, it has been discovered that, when employed in a proportion less than 0.1%, e.g. 0.01 to 0.1%, in a mixture prepared for tableting, such a silica gel imparts increased mobility to the particles of the mixture, which results in a better flow through the feed hoppers employed in tableting machines, more regular distribution of the product in the moulds and, with equal compression power, better agglomeration. Thus, a new means of manufacturing tablets is provided, which involves no previous granulating operation, and which is suitable for all the aforesaid types of tablets.

The following example will serve to illustrate the invention.

EXAMPLE

*Production of Tablets of Acetylsalicylic Acid*

The mixture employed had the following percentage composition:

| | Percent |
|---|---|
| Acetylsalicylic acid | 89 |
| Silica gel, microfine powder | 0.03 |
| Wheat starch (moisture 11%) | 10.97 |

The acetylsalicylic acid and the silica gel in the form of microfine powder were first mixed for 5 minutes, the starch was then added and the mixing operation was continued for 10 minutes. The powder was then poured into a tableting machine having punches of a diameter of 13.65 mm. There were thus obtained, without any operating difficulties, tablets weighing 0.565 g. which withstood perfectly all subsequent handling operations and which disintegrated normally in water.

By proceeding under similar conditions and with the same tableting machine, but using a mixture containing no silica gel, more friable tablets of less regular weight are obtained. In order to obtain satisfactory tablets with the mixture containing no silica gel, it was necessary to operate with double compression, twenty percent of the tablets being recrushed and incorporated in the mixture for final tableting.

I claim:

1. A method of making tablets which comprises incorporating in a powdered composition which is to form the tablets a proportion of at most 0.1% by weight of silica gel in the form of microfine powder and subjecting the resulting powdered composition to tableting.

2. A composition for tableting comprising a powdered composition containing a pharmaceutically active substance, a diluent therefor and at most 0.1% by weight of silica gel in the form of microfine powder.

3. Tablets of pharmaceutical compositions comprising a compressed powder of a mixture of pharmaceutically active substances and diluent therefor together with a proportion of silica gel in microfine powder form not exceeding 0.1% by weight of the composition.

References Cited in the file of this patent

UNITED STATES PATENTS

| 2,059,811 | Sauer | Nov. 3, 1936 |
| 2,444,282 | Creevy | June 29, 1948 |
| 2,951,791 | Stearns | Sept. 6, 1960 |

FOREIGN PATENTS

| 812,564 | Great Britain | Apr. 29, 1959 |